UNITED STATES PATENT OFFICE.

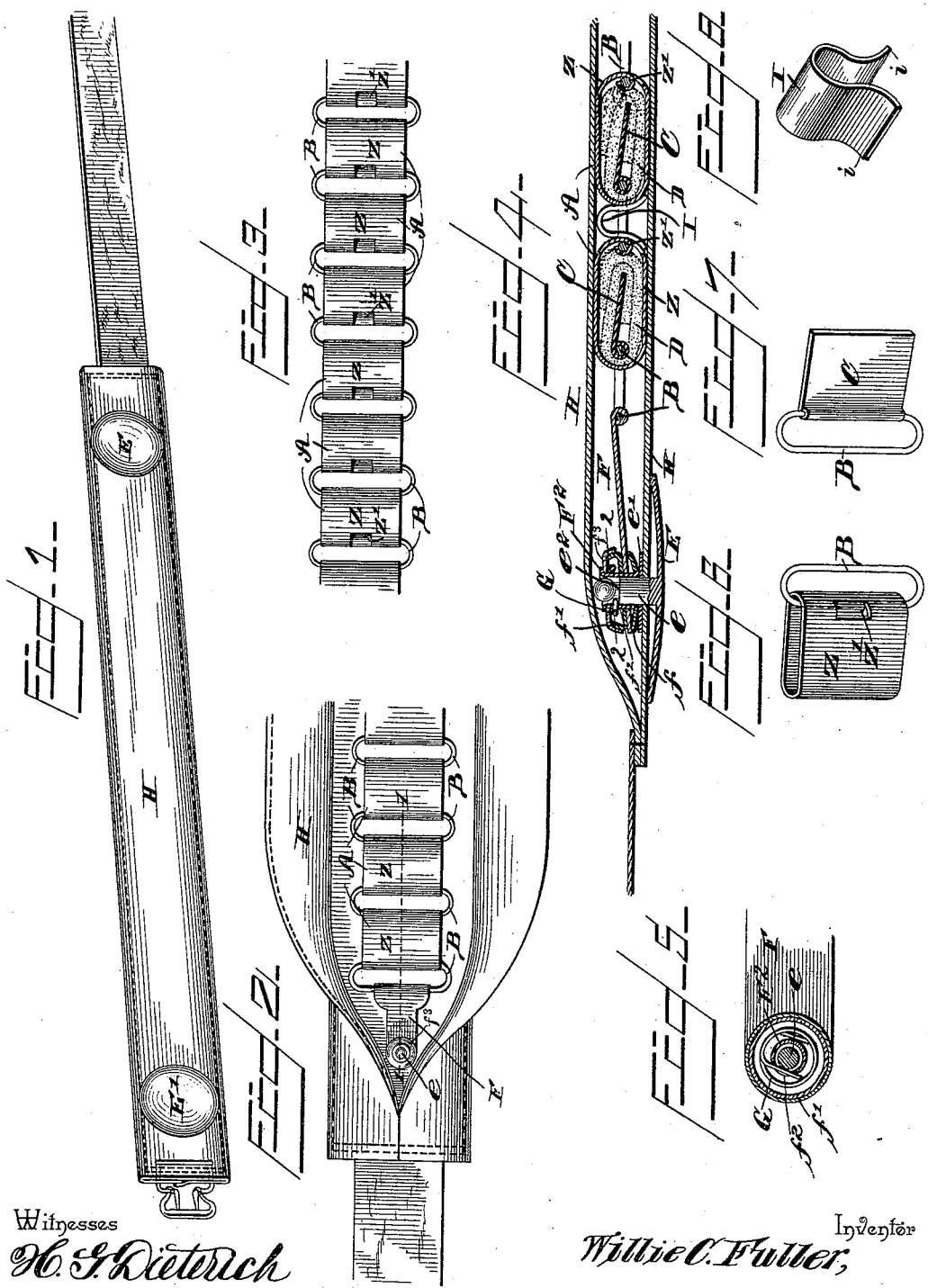

WILLIE C. FULLER, OF KIRWIN, KANSAS.

ELECTRIC BELT.

SPECIFICATION forming part of Letters Patent No. 448,953, dated March 24, 1891.

Application filed January 21, 1891. Serial No. 378,579. (No model.)

*To all whom it may concern:*

Be it known that I, WILLIE C. FULLER, a citizen of the United States, residing at Kirwin, in the county of Phillips and State of Kansas, have invented a new and useful Electric Belt, of which the following is a specification.

My invention relates to electric belts; and it consists, essentially, of a battery composed of a number of cells suitably connected together and inclosed within a flexible casing adapted to be worn round the body, as is usual in devices of this character.

The object of the invention is to provide a battery of this class which will be simple in construction, easily cleaned and charged, and very effective for the purpose designed.

A further object of the invention is to provide means whereby the strength of the current may be regulated to suit circumstances, and also to provide means whereby the battery may be disconnected from the contact-plates and the poles thereof reversed to change the polarity of the said plates.

These objects and such others as fairly fall within the scope of the invention I attain by means of the mechanism illustrated in the accompanying drawings, the peculiar construction, combination, and arrangement of which will be fully described hereinafter, and the specific points of novelty particularly pointed out in the claims.

In the drawings, Figure 1 is a perspective view of a belt constructed in accordance with my invention. Fig. 2 is an elevation of one end thereof with the casing open, showing a few of the cells connected to one of the contact-plates. Fig. 3 is an elevation of a few of the cells, looking at the opposite side thereof. Fig. 4 is a sectional view on the line 1 1 of Fig. 2, showing one of the regulating-keys in position. Fig. 5 is a sectional view through the connection on the line 2 2 of Fig. 4. Fig. 6 is a perspective view of one of the zincs. Fig. 7 is a similar view of one of the coppers, and Fig. 8 is a similar view of one of the regulating-keys.

Similar letters of reference designate corresponding parts in the several views, referring to which—

A designates a series of cells suitably connected together by links B of conducting material. Each of the cells A is composed of a zinc Z, a copper C, and an absorbent material D. The zinc Z is of tubular shape, and may be flattened on one or both sides, as shown, if found desirable. About midway of the length of the said zinc tube a rectangular cut is made, leaving a tongue Z', which is cut loose from the body of the zinc tube on three sides, but left integral therewith on its fourth. The wire of which the link B is formed is passed through the zinc tube and the tongue Z' is turned in and over the said wire, as shown in Fig. 4, thus making a flexible electrical connection.

The copper C is a flat plate of the proper size to fit within the zinc tube Z and leave sufficient space for the absorbent material to be placed around it within the said zinc tube. One edge of the copper plate C is turned over the link B, thus securing the plate to the link in a flexible manner and at the same time making a good electrical contact therewith.

The links B, it will be seen, form the electrical connection from the copper of one cell to the zinc of the next, and at the same time serve to hold the cells together.

The absorbent material D is arranged around the copper so as to completely inclose the same and keep it from making contact with the zinc, and the copper inclosed within the absorbent material is placed within the zinc tube Z. The absorbent material D is made somewhat smaller than the space between the copper and the zinc, so that the cell may be easily cleaned by soaking in hot water and then blowing through the same. The air passing through the space and through the pores of the absorbent material will carry off any foreign matter which may have accumulated therein. Thus the efficiency of the battery may be preserved.

The contact-plates E E' are in the form of disks, and are secured to the casing of the belt on the side which is worn next to the body, so as to be in contact with the skin, and each of the disks E E' have a stud e, projecting from the center thereof, which passes through the casing and is secured thereto by means of a washer e' or other suitable means. The stud e projects into the inside of the casing and has a groove $e^2$ around it near the inner end thereof.

Upon the link B at the ends of the series of cells is secured a connecting-piece F, the link B connecting the piece F to the copper to form the positive pole of the battery, and the opposite end of the series is similarly connected with the zinc to form the negative pole.

The connecting-piece F is provided with a sleeve $F^2$, which passes through the said connecting-piece and is adapted to fit over the studs $e$, which project inward from the contact-plates E E'. A washer $f$ may be placed around the sleeve $F^2$ on the side of the connecting-piece F, which is next to the casing, to secure the said sleeve $F^2$ more firmly to the said connecting-piece, and a cup-shaped washer $f'$ is placed around the sleeve $F^2$ on the opposite side of the connecting-piece. A wire spring G is coiled around the sleeve $F^2$ a few times and one end thereof enters the said sleeve through a slot $f^2$, as clearly shown in Fig. 5. When the sleeve $F^2$ is in position upon the stud $e$, the end of the spring G, which projects through the slot $f^2$, extends into the groove $e^2$ of the said stud and thus prevents the accidental displacement of the sleeve and consequently of the connecting-piece F. A cover $f^3$ is placed over the cup-shaped washer $f'$ to inclose the spring, and the whole is pressed tightly together. Thus it will be seen that the sleeve $F^2$, and with it the piece F, may be pulled from or placed upon the stud $e$ of the contact-plates E E', the springs G yielding to pass over the end of the stud $e$, but springing into the groove $e^2$ to hold the said sleeves in position.

In operation the absorbent material D is saturated with water or with a suitable acidulated liquid and the battery placed within the casing H, the positive and negative connecting-pieces F pressed upon the studs $e$ of the contact-plates E and E', thus electrically connecting the battery to the said plates, which latter will then form the poles of the battery. It will be understood that the positive of the battery may be connected to either of the contact-plates E or E', as circumstances may require. The belt is then placed around the body, so that the disks E and E' will be in contact with the skin at the points where it is desired to apply the current and held in position by means of a suitable strap and buckle, as is usual. Should the current be too strong, it may be weakened by placing a suitable number of the keys I (shown in Fig. 8) between some of the cells, the effect of which will be to short-circuit the cells between which the keys I are placed and thus reduce the strength of the current.

The keys I are formed of a piece of flat metal, preferably brass, bent in the shape of a U, with the ends turned outwardly, as at $i$. The keys I are pressed together and inserted between the cells A and allowed to spring apart to press against the said cells, the bent ends $i$ holding the said keys in position, as shown in Fig. 4.

Having thus described my invention, what I claim, and desire to secure by Letters Patent, is—

1. In an electric belt, the combination of a battery formed of tubular zinc cells, each cell having a tongue Z', links B, which pass through the said tubular cells and are connected thereto by means of the tongues Z', which latter are turned over the said links, coppers arranged within the zinc cells and connected to the link B from the zinc of the next succeeding cell, and absorbent material placed within the zinc cells around the said coppers and saturated with a suitable electrolyte, with means for connecting the said battery with contact-plates upon a belt, substantially as described.

2. In an electric belt, the combination of a battery formed of tubular zinc cells, each cell having a tongue Z', links B, which pass through the said tubular cells, and are connected thereto by means of the tongues Z', which latter are turned over the said links, coppers arranged within the zinc cells and connected to the link B from the zinc of the next succeeding cell, absorbent material placed within the zinc cells around the said coppers and saturated with a suitable electrolyte, with a casing for inclosing the said battery, contact-disks upon the said casing, and means for connecting the poles of the said battery to the said contact-disks and for holding the said casing upon the body, substantially as described.

3. In an electric belt, the combination of a battery consisting of a number of cells suitably connected together, connecting-pieces secured to the opposite ends of the said battery, sleeves upon the said connecting-pieces, and springs coiled around the said sleeves and extending through slots therein, with contact-disks having studs projecting inwardly therefrom, upon which the sleeves are adapted to be held by means of the springs, substantially as described.

4. In an electric belt, the combination of a battery consisting of a number of cells suitably connected together, connecting-pieces secured to the opposite ends of the said battery, sleeves upon the said connecting-pieces, springs coiled around the said sleeves and extending through slots therein, with contact-disks, and studs projecting inwardly from said disks, said studs having grooves around them in which the springs G are adapted to engage when the sleeves are in position, substantially as described.

5. In an electric belt, the combination of a battery consisting of a number of cells suitably connected together, connecting-pieces secured to the opposite ends of the said battery, sleeves upon the said connecting-pieces, springs coiled around the said sleeves and extending through slots therein, with a casing for inclosing the said battery, contact-disks upon the said casing, and studs projecting inwardly from the contact-disks through the casing, the said studs having grooves around them, the sleeves of the connecting-pieces being adapted to fit upon the said studs and be held thereon by means of the spring G to electrically connect the terminals of the battery with the contact-disks, substantially as described, for the purpose specified.

In testimony that I claim the foregoing as my own I have hereto affixed my signature in presence of two witnesses.

WILLIE C. FULLER.

Witnesses:
W. J. PALMER,
ALBERT FULLER.